C. R. Hewett.
Straw-Cutter & Corn-Sheller.
N° 73,184      Patented Jan. 7, 1868.
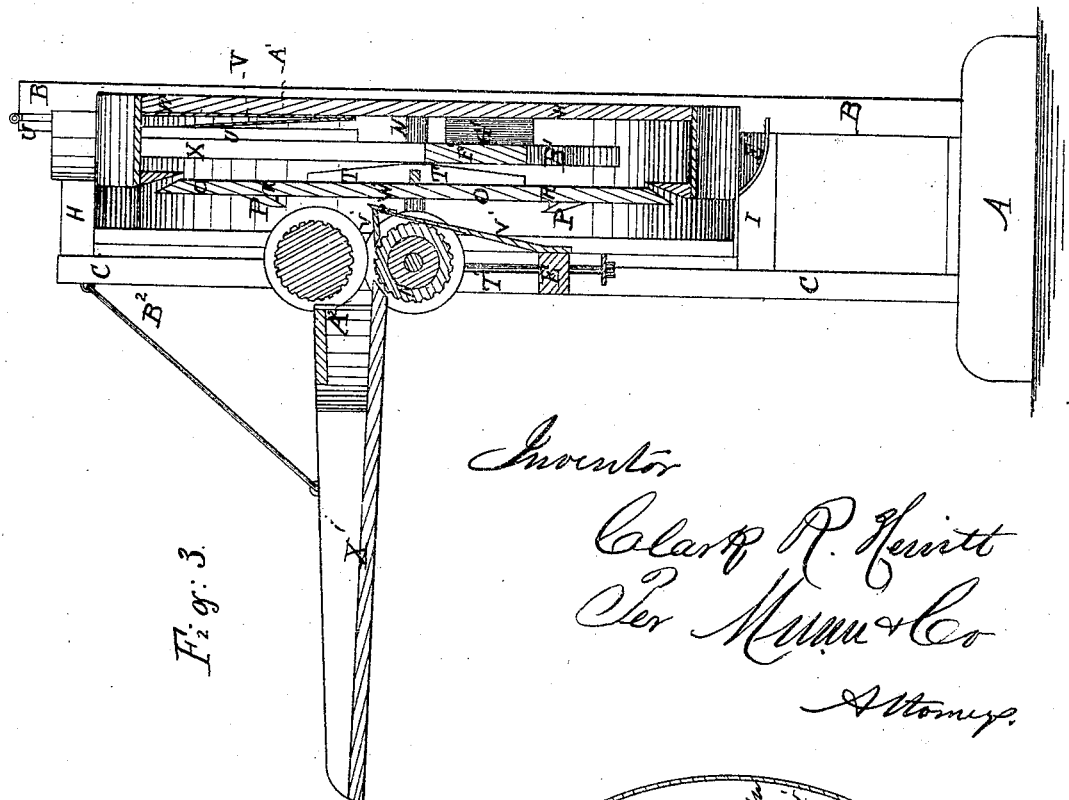
Fig: 3.
Inventor
Clark R. Hewitt
Per Munn & Co
Attorneys.
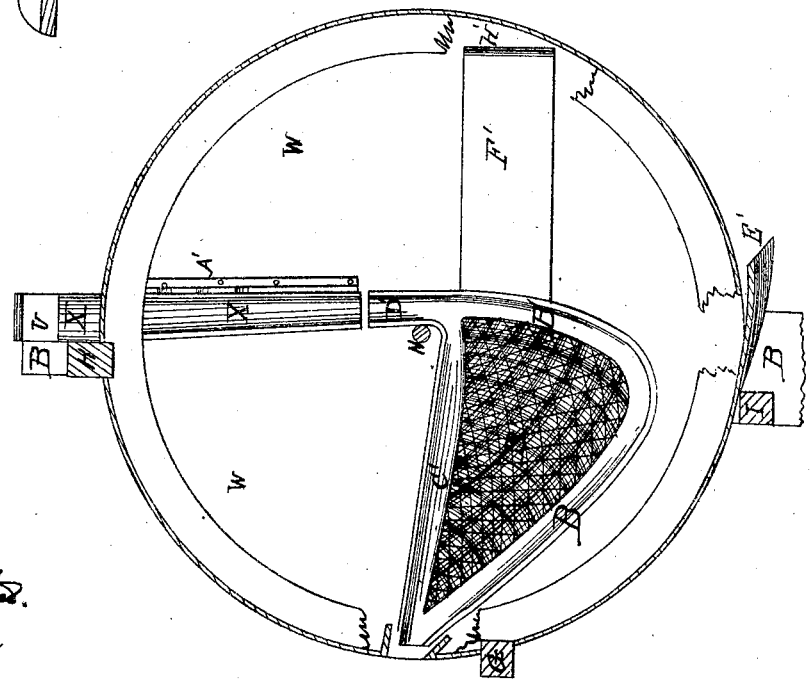
Fig: 4.
Witnesses

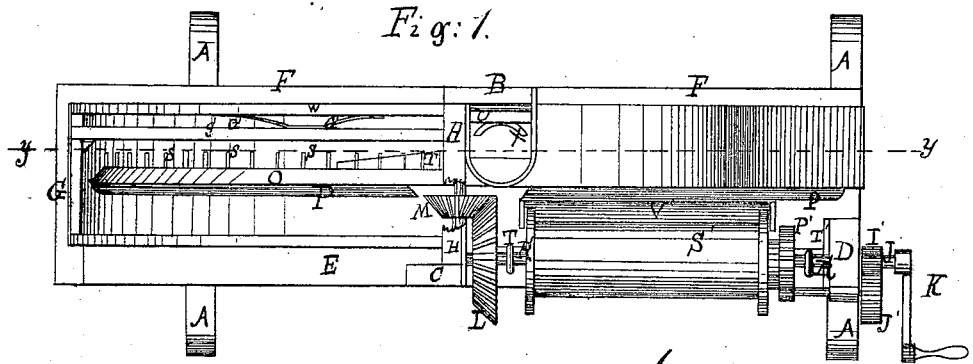
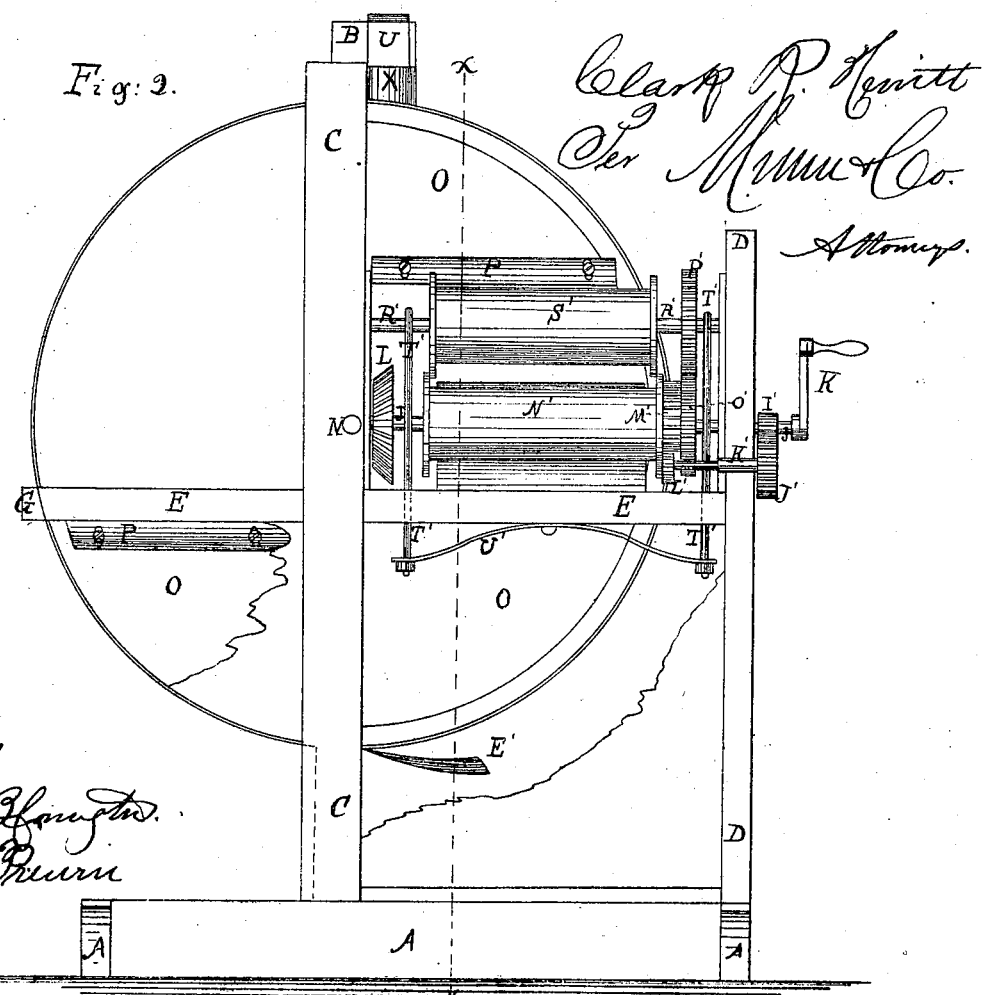

United States Patent Office.

CLARK R. HEWETT, OF WAUPUN, WISCONSIN.

*Letters Patent No. 73,184, dated January 7, 1868.*

IMPROVEMENT IN STRAW-CUTTER AND CORN-SHELLER COMBINED.

*The Schedule referred to in these Letters Patent and making part of the same.*

TO ALL WHOM IT MAY CONCERN:

Be it known that I, CLARK R. HEWETT, of Waupun, in the county of Dodge, and State of Wisconsin, have invented a new and improved Combined Fodder-Cutter and Corn-Sheller; and I do hereby declare that the following is a full, clear, and exact description thereof, which will enable others skilled in the art to make and use the same, reference being had to the accompanying drawings, forming a part of this specification, in which—

Figure 1 is a top view of my combined machine, a part of the cover being removed.

Figure 2 is a side view of the same, the cutter-box being removed, and portions of the panelling being broken away.

Figure 3 is a vertical section of the same, taken through the line $x\ x$, fig. 2, the cutter-box being in place.

Figure 4 is a vertical section of the same, taken through the line $y\ y$, fig. 1.

Similar letters of reference indicate like parts.

My invention has for its object to furnish a machine by means of which corn may be shelled or fodder cut, as may be desired, with equal facility; and it consists, first, of the balance-wheel, and the shafts and bevel-gear wheels by which motion is communicated to said balance-wheel, in combination with each other and with the frame of the machine; second, the combination of cutter-knives and sheller-teeth with the balance-wheel of a combined fodder-cutter and corn-sheller; third, the combination of the rubber springs with the knives and balance-wheel; fourth, the feed-rollers, in combination with each other, with the driving-shaft, and with the frame of the machine; the whole being constructed and arranged as hereinafter more fully described.

A is the foundation-frame or feet of the machine; B, C, and D are the uprights or frame of the machine; E, F, and G is the horizontal frame which supports the casings of the machine; H and I are cross-timbers connecting the uprights B and C; J is the driving-shaft. This shaft revolves in bearings attached to the uprights C and D; and to its outer end is attached the crank K, by which motion is communicated to the machine. To the inner end of the shaft J is attached a bevel-gear wheel, L, which meshes into a bevel-gear wheel, M, attached to the shaft N. This shaft revolves in bearings attached to the uprights B and C, and to it is attached the balance-wheel O. To the side of the wheel O are attached two or more knives, P, so arranged that the end of the knives farthest from the centre of the wheel O shall first come in contact with the material to be cut. The knives P are attached to the wheel by screws passing through slots in the said knives, by which means the position of the knives may be adjusted as required. Between the knives P and the side of the wheel O are placed rubber springs R, which keep the knives P pressed out against the stationary knife attached to the edge of the mouth-piece of the cutter-box. The other side of the balance-wheel O is covered with projecting cast-iron teeth S, as shown in fig. 1. Its central part is also provided with radial flanges T, equalling, or a little exceeding, the teeth in height; the object of which will be hereinafter described. U is a wooden bar, hinged at its upper end to the top of the upright, B, as shown in the drawings. To its under side is attached a spring, V, resting against the inner side of the casing W, as shown in fig. 3. The tendency of this spring is to force the block or bar U inward towards the balance-wheel O. To the inner side of the bar U is firmly attached a grooved or half round metallic plate, X, along the groove of which the ear of corn passes into the machine. $A^1$ is a plate, immovably attached to the casing W by a flange, as shown in fig. 4. The projecting edge of this plate should extend so far towards the balance-wheel O as to prevent the ear of corn being revolved out of the groove in the plate X by the action of the teeth S, and its projecting edge may be serrated, if desired, so as to allow the kernels of corn to pass through it. $B^1$ is a metallic plate, made in the form represented in fig. 4, the face of which is toothed, as shown. It has also a half round groove, C', along its upper edge, said groove leading to an opening through the edge casing, as shown. The ear of corn enters through an opening in the top of the machine, as seen in fig. 1; thence it passes down along the groove in the plate X, being all the time acted upon by the teeth S; thence it passes down through the grooved neck part D' of the plate $B^1$. When it reaches the body or chamber of said plate $B^1$, it is revolved by the action of the teeth S and flanges T across the toothed face of said plate into the groove C', and thence to the outside of the machine, the corn having been entirely removed during its passage. The corn escapes at the bottom of the machine through the spout E'. The plate $B^1$ is firmly attached to the wooden bar F', and is held forward towards the balance-wheel O by the spring G', which is attached to the bar F', and presses against the face of the casing W, as shown in fig. 1. The end of the bar F' is attached to the casing W by a hinge, H', as shown in fig. 4. The machine should be encased, as shown, to prevent the corn from flying about. To the projecting end of the shaft J is attached a small cog-wheel, I', which meshes into the cog-wheel J' attached to the shaft K'. This shaft revolves in bearings attached to the upright D, and has on its other end a small cog-wheel, L', which meshes into a cog-wheel, M', securely attached to the end of the feed-roller N'. The cog-wheel O' is also attached, in connection with the cog M', to the end of the said roller N', and it meshes into the cog-wheel P' attached to the shaft R' of the upper feed-roller S'. The roller N' revolves freely upon the shaft J, but the roller S' is attached to and revolves with its shaft, R'. The shaft R' revolves in slotted bearings attached to the uprights C and D, and is held down to its place and enabled to adjust the space between the rollers to the amount of material passing through the cutter-box, by hooks or links T', the lower ends of which are connected with the spring U', as shown in fig. 2. V' is the mouth-piece of the cutter-box. This mouth-piece is cast solid, with a downwardly-projecting apron, the lower edge of which is attached to the horizontal frame E, as shown in fig. 3. And to its upper edge is attached the stationary knife W', by screws passing through slots in said knife, so as to make it adjustable. The cutter-box X' is made in the usual manner and form, and is attached to the frame of the machine by means of a metallic strap, $A^2$, passing around the end of the said cutter-box, and hooking over catches attached to the upright C and D. The cutter-box may be still further supported by a rod, $B^2$, hooking into eyes attached to the upright C and the edge of the cutter-box X', as shown in fig. 3.

I claim as new, and desire to secure by Letters Patent—

1. The combination of the shafts J N, bevel-gear wheels L M, cutter-knives P, and sheller-teeth S, with the balance-wheel O of a combined fodder-cutter and corn-sheller, substantially as described, and for the purposes set forth.

2. The combination of the rubber springs R with the knives P and balance-wheel O, substantially as described, and for the purpose set forth.

CLARK R. HEWETT.

Witnesses:
  EDWIN HILLYER,
  L. D. HINKLEY.